United States Patent
Song et al.

(10) Patent No.: US 12,301,583 B2
(45) Date of Patent: May 13, 2025

(54) ACCESS CONFIGURATION IN HYBRID NETWORK ENVIRONMENTS

(71) Applicant: INTERNATIONAL BUSINESS MACHINES CORPORATION, Armonk, NY (US)

(72) Inventors: Qian Xia Song, Beijing (CN); Xiao Ling Chen, Beijing (CN); Ai Ping Feng, Beijing (CN); Chun Li Jia, Beijing (CN); Jin Jin Yang, Beijing (CN); Kui Zhang, TianJin (CN); Dong Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 17/662,242

(22) Filed: May 6, 2022

(65) Prior Publication Data
US 2023/0362170 A1    Nov. 9, 2023

(51) Int. Cl.
*H04L 9/40*    (2022.01)

(52) U.S. Cl.
CPC ........ *H04L 63/105* (2013.01); *H04L 63/0876* (2013.01)

(58) Field of Classification Search
None
See application file for complete search history.

(56) References Cited

U.S. PATENT DOCUMENTS

| 10,742,721 B1 | 8/2020 | Wagner | |
|---|---|---|---|
| 10,959,098 B2 | 3/2021 | Cidon | |
| 2003/0182591 A1* | 9/2003 | Ajanovic | H04L 12/12 713/600 |
| 2005/0041658 A1* | 2/2005 | Mayhew | H04L 41/0803 370/389 |

(Continued)

FOREIGN PATENT DOCUMENTS

| CN | 113206776 A | 8/2021 |
|---|---|---|
| CN | 114124944 A | 3/2022 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Scott B Christensen
(74) *Attorney, Agent, or Firm* — Stephen R. Yoder (57) ABSTRACT

Method, systems, and computer program products for access configuration in hybrid network environments are disclosed. According to the method, an access configuration request is received from a client device in a first network environment, wherein the access configuration request is associated with an access to a network resource in a second network environment and comprises first authentication information associated with the client device. Further, second authentication information associated with the network resource is obtained. The first and second authentication information is (Continued)

further used to determine whether the access configuration request is verified. If the access configuration request is verified, connectivity between the client device and the network resource can be automatically established.

18 Claims, 8 Drawing Sheets

(56) References Cited

U.S. PATENT DOCUMENTS

| | | | |
|---|---|---|---|
| 2014/0283010 A1* | 9/2014 | Rutkowski | H04L 63/0428 726/18 |
| 2017/0104755 A1 | 4/2017 | Arregoces | |
| 2018/0255142 A1 | 9/2018 | Benantar | |
| 2020/0021594 A1 | 1/2020 | Arregoces | |
| 2020/0371829 A1 | 11/2020 | Momchilov | |
| 2020/0374225 A1 | 11/2020 | Momchilov | |
| 2021/0133734 A1 | 5/2021 | Jensen | |

FOREIGN PATENT DOCUMENTS

| | | |
|---|---|---|
| EP | 2884418 A1 | 6/2015 |
| WO | 2017160409 A1 | 9/2017 |

OTHER PUBLICATIONS

"Patent Cooperation Treaty PCT International Search Report", Applicant's File Reference: F23W3675, International Application No. PCT/CN2023/086970, International Filing Date: Apr. 7, 2023, Date of Mailing: Jun. 20, 2023, 7 pages.

* cited by examiner

(PRIOR ART)

FIG. 5

(PRIOR ART)

ACCESS CONFIGURATION IN HYBRID NETWORK ENVIRONMENTS

BACKGROUND

The present disclosure relates to computer techniques, and more specifically, to access configuration in hybrid network environments.

Cloud computing infrastructures are becoming increasingly popular due to their increased scale, agility, and elasticity arising from the ability to quickly provision and use precisely the requisite amount of compute resources on-demand (in the case of cloud computing infrastructures) to meet increased customer demands.

In recent years, hybrid clouds have become more and more popular. For example, enterprise network policies often force all traffic to go through their secure WAN gateways. Such policies can be very inefficient, particularly if they apply access permissions to different network zones with security levels among private clouds or from public cloud to private cloud.

SUMMARY

According to one embodiment of the present invention, there is provided a computer-implemented method. The method may comprise: receiving, by one or more processors, an access configuration request from a client device in a first network environment, the access configuration request being associated with an access to a network resource in a second network environment and comprising first authentication information associated with the client device; obtaining, by one or more processors, second authentication information associated with the network resource; determining, by one or more processors, whether the access configuration request is verified based on the first and second authentication information; and in accordance with a determination that the access configuration request is verified, establishing, by one or more processors, connectivity between the client device and the network resource.

According to another embodiment of the present invention, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description of cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
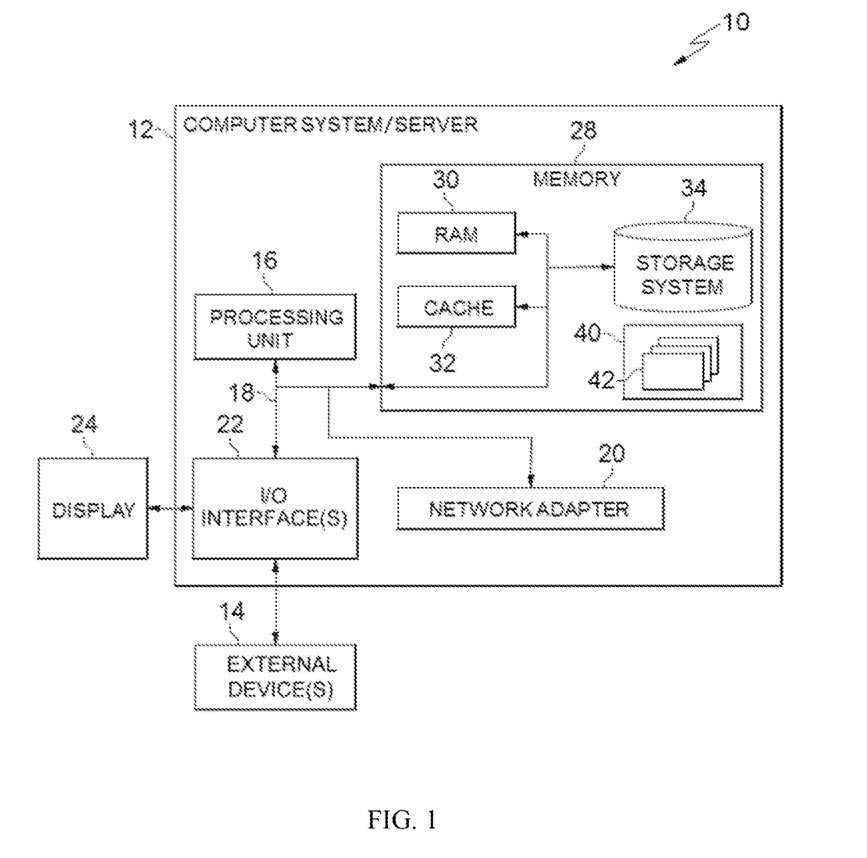
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
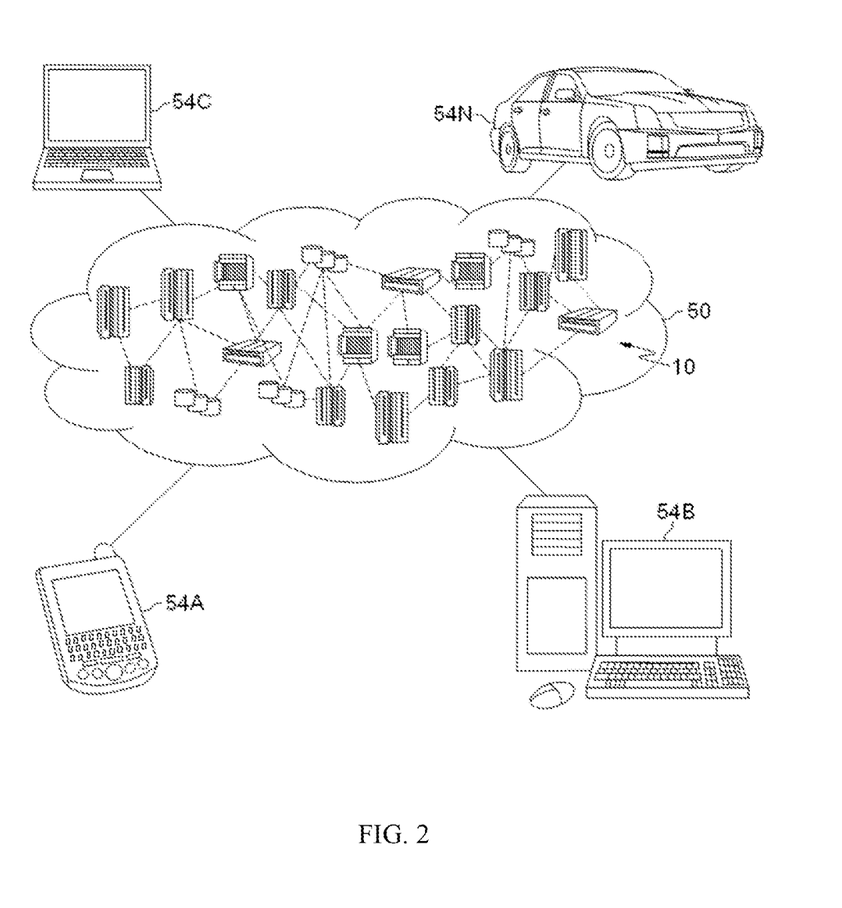
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
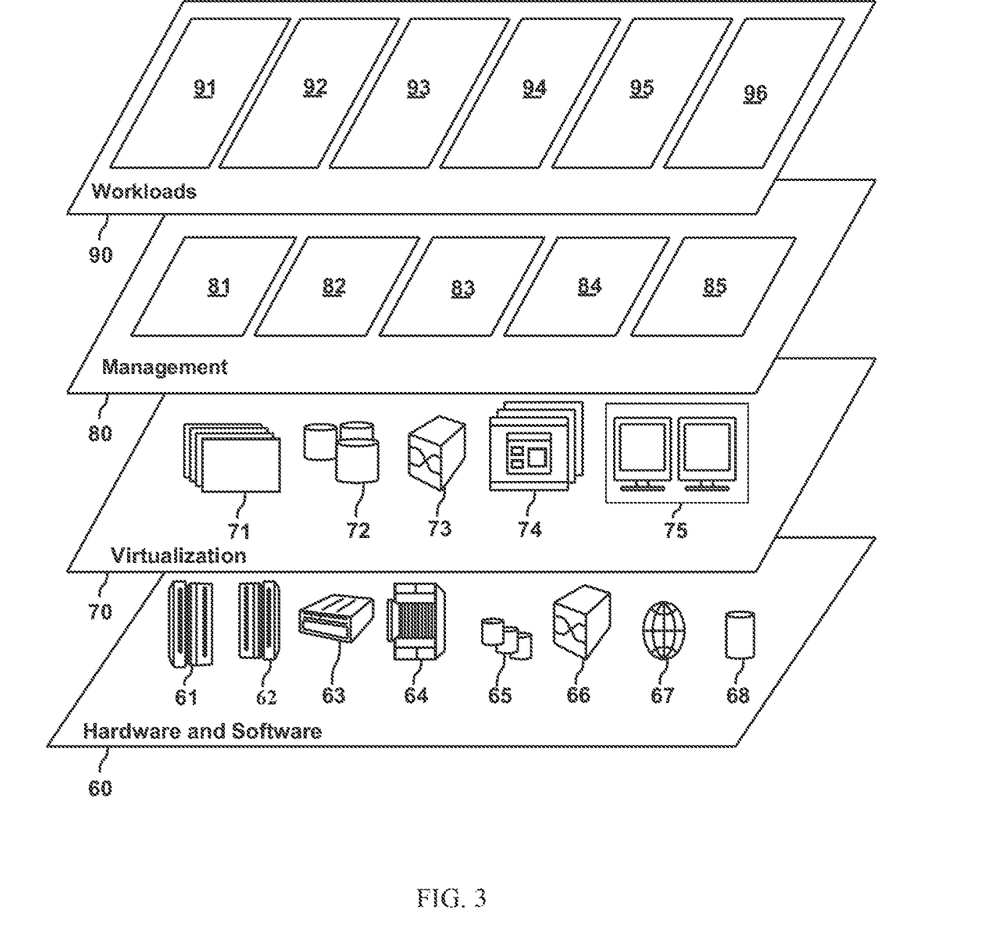
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access configuration 96.

As discussed, hybrid clouds have become more and more popular. For example, enterprise network policies often force all traffic to go through their secure WAN gateways. It is really painful and inefficient to apply the access permissions to different network zones with security levels among private clouds or from public cloud to private cloud.

Figure 4:
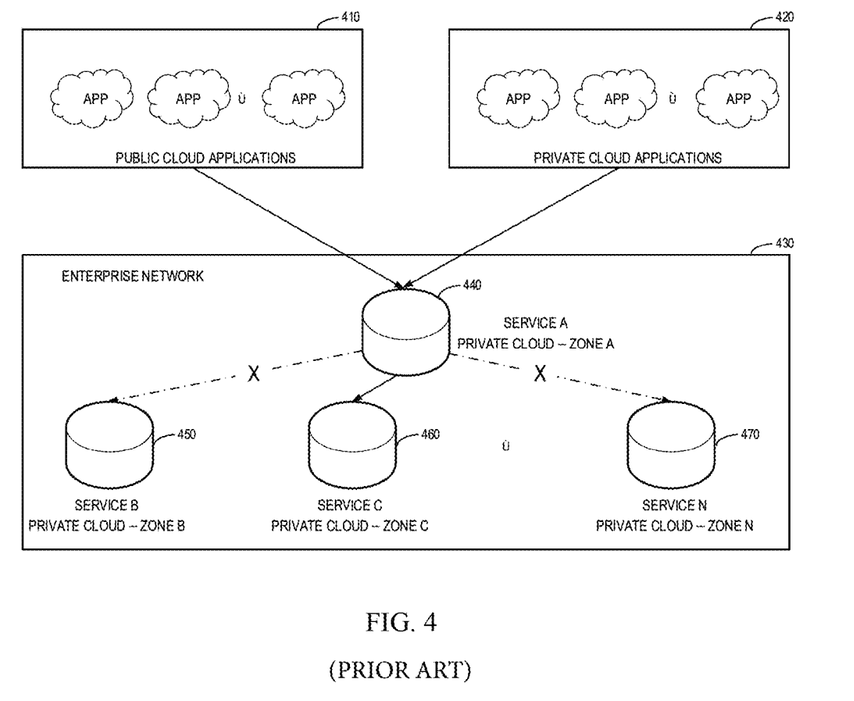
FIG. 4 depicts a traditional access mechanism in an example hybrid network environment.

FIG. 4 depicts a traditional access mechanism in an example hybrid network environment 400. As shown in FIG. 4, many applications, e.g., public cloud applications 410 and private cloud applications 420, are deployed to different servers which may be located in different public clouds or private clouds, and such applications need to access the services from several zones of the same enterprise network 430. However, service A 440, service B 450, service C 460 and service N 470 may be arranged in the different zones, e.g., private cloud-Zone A, private cloud-Zone B, private cloud-Zone C, and private cloud-Zone N.

In some scenarios, the different zones in the enterprise network 430 may be associated with different access policies. For example, as shown in FIG. 4, the applications 410 and 420 may be able to access service A 440 and service C 460, but may be unable to access service B 450 and service N 470.

In order to obtain the access to service B 450 or service N 470, traditionally, the users may need to contact an administrator and the administrator may then manually set access configuration for allowing the users to access the target services, e.g., service B 450 or service N 470.

Figure 5:
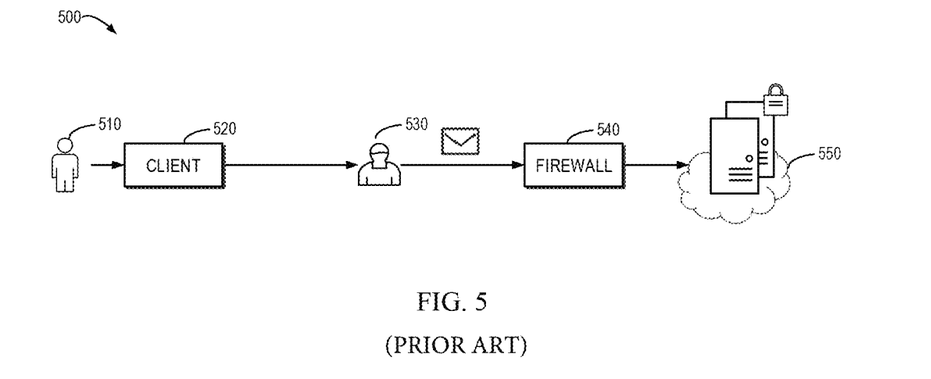
FIG. 5 depicts a traditional access configuration procedure in the example hybrid network environment.

FIG. 5 depicts a traditional access configuration procedure 500 in an example hybrid network environment 500. As shown in FIG. 5, a client device 520 of a user 510 may send a request to access a particular network resource 550 to an administrator 530. After verifying that the user 510 is allowed to access the network resource 550, the administrator 530 may send an instruction to a firewall 540, for example, to add the user 510 or the client device 520 to a permission list, also referred to as a allow list or an allow list. In this way, the user 510 can be allowed to access the network resource 550 through the administrator's manual configuration.

However, such manual configuration by the administrator may consume a lot of time and energy of the administrator and may also block normal operations of business processes.

Figure 6:
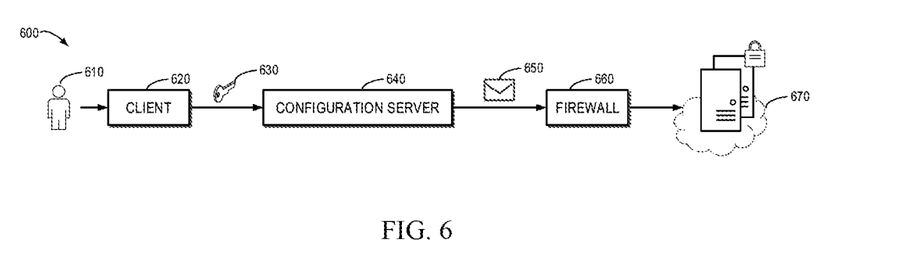
FIG. 6 depicts a proposed access configuration procedure in accordance with some embodiments of the present disclosure.

In accordance with some embodiments of the present disclosure, there is provided a solution for access configuration in a hybrid network environment. FIG. 6 depicts a proposed access configuration procedure 600 in accordance with some embodiments of the present disclosure.

As shown in FIG. 6, a client device 620 of a user 610 may send an access configuration request to a configuration server 640. The access configuration request may be associated with an access to a network resource 670. In some embodiments, the network resource may comprise at least one selected from the group consisting of one or more servers in the second network environment, one or more services deployed in the second network environment, or one or more storage devices in the second network environment.

In some embodiments, the access configuration request may comprise first authentication information 630 associated with the client device 620.

In some embodiments, the first authentication information 630 may be generated based on a secret key associated with the network resource 670. For example, the first authentication information 630 may be generated by encrypting a token associated with the network resource 670, where the token is generated using a secret key of the network resource 670.

Further, the configuration server 640 may obtain second authentication information associated with the network resource, and determine whether the access configuration request from the client device 620 can be verified based on the first and second authentication information. For example, the second authentication information may be a secret key of the requested network resource.

In a case that the access configuration request from the client device 620 is verified, the configuration server 640 may automatically establish connectivity between the client device 620 and the network resource 670. For example, the configuration server 640 may send an instruction 650 to a firewall 660 to add the client device 620 to a permission list (e.g., allow list), thereby the connectivity between the client device 620 and the network resource 670 can be established.

Figure 7:
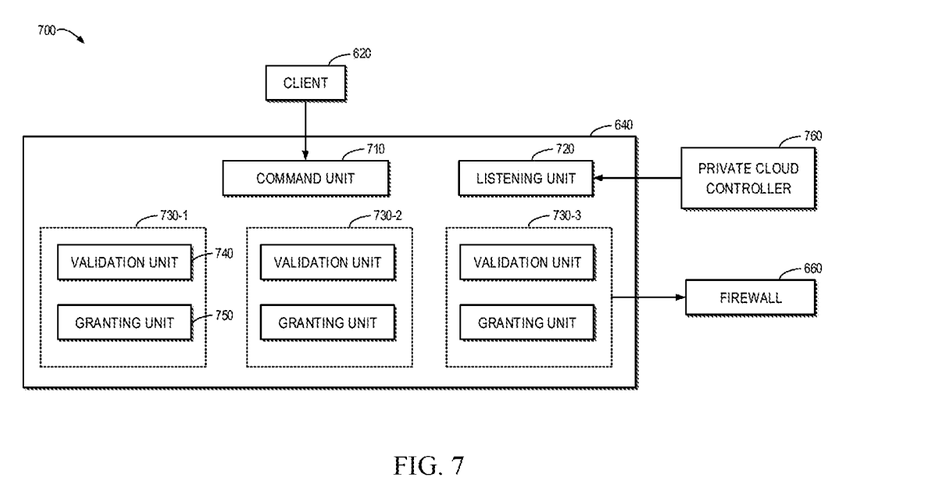
FIG. 7 depicts a block diagram of the configuration server in accordance with some embodiments of the present disclosure.

FIG. 7 depicts a block diagram 700 of the configuration server 640 in accordance with some embodiments of the present disclosure. As shown in FIG. 7 the configuration server 640 may comprise a command unit 710 and a listening unit 720.

In some embodiments, the command unit 710 may be configured to receive the access configuration request from the client device 620. The command unit 710 may then initiate a validation container for validating the access configuration request. If the validation is successful, the command unit 710 may grant the client device 620 access to the network resource 670. For example, one or more validation containers, for example, the validation container 730-1, 730-2 and/or 730-3 (individually or collectively referred to as validation container 730 herein), may be executed concurrently. A validation container 730 may comprise a validation unit 740 and a granting unit 750.

In some embodiments, the access configuration request may comprise a HTTP (Hyper Text Transfer Protocol) or HTTPS (Hyper Text Transfer Protocol over Secure Socket Layer) request, and a header of the HTTP or the HTTPS request may indicate at least one selected from the group consisting of a first identity of the network resource and an access mode of the access.

Figure 8:
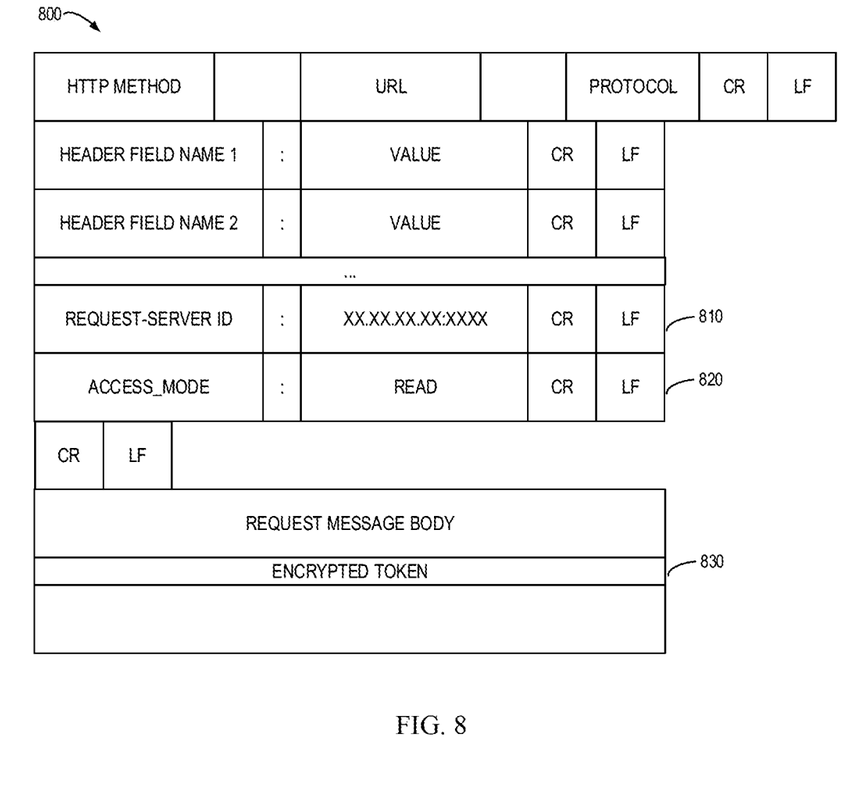
FIG. 8 depicts a structure of an example HTTP request in accordance with some other embodiments of the present disclosure.

FIG. 8 depicts a structure of an example HTTP request 800 in accordance with some other embodiments of the present disclosure. As shown in FIG. 8, the HTTP request 800 may comprise a field "REQEUST-SERVER ID" 810 in the header, for indicating the identity of the requested network resource 670. Further, the HTTP request 800 may also comprise a field "ACCESS_MODE" 820 in the header, for indicating an access mode of the requested access to the network resource 670.

In some embodiments, the HTTPS request 800 may further encapsulate the encrypted token 830 in the message body. The encrypted token 830 may be generated by the client device 620 through encrypting a token generated using the secret key of the network resource 670.

In some embodiments, the client device 620 may present a user interface to the user 610 and obtain the secret key input by the user 610. Further, the client device 620 may encrypt the secret key using any proper encryption methods, and then encapsulate the encrypted secret key in the message body of a HTTP request.

Referring back to FIG. 7, the command unit 710 may receive the access configuration request (e.g., the HTTP request 800 in FIG. 8) and extract the encrypted token, the first identity of the network resource and/or the access mode of the access from the access configuration request.

In some embodiments, the command unit 710 may initiate a new container for example by generating a Yet Another Multicolumn Layout (YAML) file (e.g., a *.yaml, *.yml file or similar configuration file) based on the extracted information from the access configuration request. The YAML file may comprise the encrypted token, the first identity of the network resource and/or the access mode of the access from the access configuration request.

In some embodiments, the validation unit 740 in the initiated container 730 may determine whether the access configuration request can be verified based on the first authentication information, e.g., the encrypted token comprised in the YAML file, and the second authentication information associated with the network resource 670.

In some embodiments, the listening unit 702 may be configured to monitor the statuses of the network resources in the second network environment (e.g., a private cloud).

Figure 9:
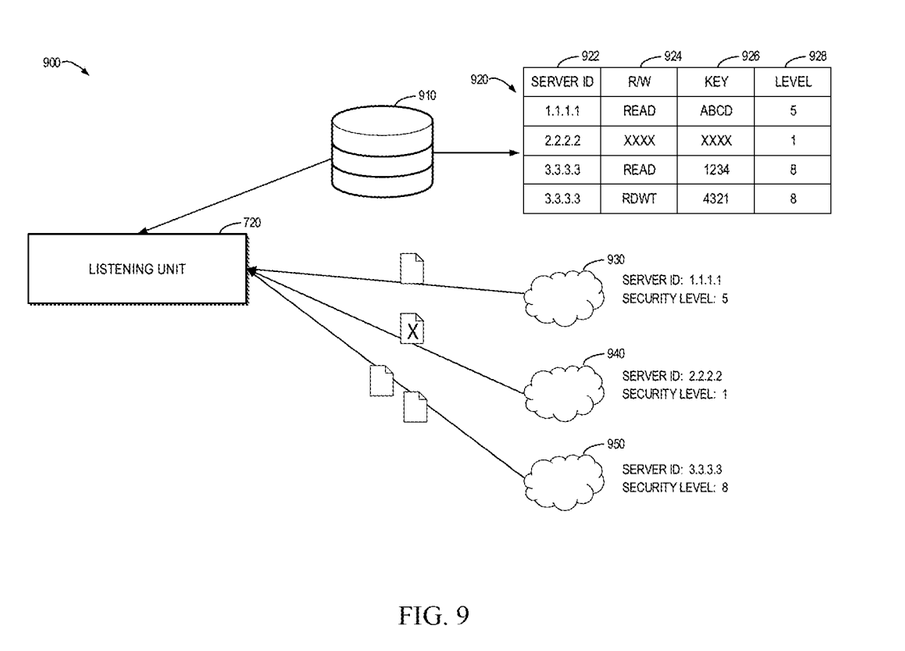
FIG. 9 depicts a block diagram of actions of an example listening unit in accordance with some embodiments of the present disclosure.

As shown in FIG. 7, the listening unit 720 may communicate with a private cloud controller 760, for monitoring the network resources in the private cloud. FIG. 9 depicts a block diagram 900 of actions of an example listening unit 720 in accordance with some embodiments of the present disclosure.

For example, as shown in FIG. 9, upon determining that the server with ID 1.1.1.1 becomes available and the security level of the server is below a security threshold, the private cloud controller 760 may send a secret key associated with the server to the listening unit 720.

In another example, if the security level of the server is above or equal to the security threshold, the private cloud controller 760 may send a notification to the listening unit 720 without providing the secret key of the server to the listening unit 720. In this way, only when a security level of a network resource is below a security threshold, the access to the network service can then be automatically configured by the configuration server 620.

Further, as shown in FIG. 9, the listening unit 720 may obtain the secret keys of the network resources in the private cloud, and then store the keys in association with other information of the respective network resources in a database 910. In addition, the container 730 may query the database 910, which is not shown in FIG. 9.

For example, a data table 920 may be maintained by the listening unit 720. The data table may comprise multiple fields, such as, SERVER ID 922, R/W 924, KEY 926 and LEVEL 928.

The field SERVER ID 922 may indicate an identity of the network resource, such as servers 930, 940 or 950. In some embodiments, the identity of the network resource may comprise an IP address.

The field R/W 924 may indicate a corresponding access mode, e.g., READ, WRITE, or RDWT (i.e., read and write). In some embodiments, different access mode with respect to a same network resource may be associated with different secret keys and/or different security levels.

The field KEY 926 may indicate a secret key corresponding to the network resource and the access mode. The field LEVEL 928 may indicate a security level corresponding to the access to the network resource.

Referring back to FIG. 7, the container 730 initiated by the command unit 710 may determine whether the access configuration request can be verified based on the first authentication information received from the client device 620 and the second authentication information, for example, the secret key stored in the database 910.

In some embodiments, the validation unit 740 may determine the second authentication information from a set of network resource information corresponding to a set of network resources based on the first identity of the network resource 670. For example, the validation unit 740 may obtain a secret key by querying the data table 920 using an IP address of the network resource 670, which is not shown in FIG. 7.

In some embodiments, the determining of the second authentication information from the set of network resource information may be based on the first identity of the network resource and the access mode of the access. For example, the validation unit 740 may obtain a secret key by querying the data table 920 using an IP address of the network resource 670 and an access mode as indicated in the received access configuration request.

In some embodiments, the validation unit 740 may determine whether the client token matches with the secret key. In response to the client token matching the secret key, the validation unit 740 may determine that the access configuration request is verified.

For example, the validation unit 740 may decrypt the encrypted token comprised in the request, and then check whether the token can be decrypted using the corresponding secret key obtained from the database 910. If the token can be successfully decrypted, the validation unit 740 can determine that the access configuration request can be verified, and the grant unit 750 may automatically establish the connectivity between the client device 620 and the network resource 670.

In some embodiments, as shown in FIG. 7, the grant unit 750 may add an identity of the client device 620 to the permission list of the firewall 660.

In some embodiments, when all work of a container 730 is done, the container 730 can be automatically destroyed. For example, in response to the establishment of the connectivity between the client device and the network resource, the initiated container 730 can be automatically released.

In some embodiments, upon establishing connectivity between the client device 620 and the network resource 670, the configuration server 640 may send to the client device 620 a notification that the connectivity between the client device and the network resource has been successfully established.

In some embodiments, the set of network resource information may be dynamically updated. For example, the network resource 670 may be a second network resource. The configuration server 640 may obtain a notification indicating an initiation of the second network resource in a third network environment. The third network environment may be different from or same as the second network environment. The notification may include third authentication information associated with the second network resource. The third authentication information may be a secret key associated with the second network resource. The network resource 670 may update the set of network resource information by adding additional network resource information corresponding to the second network resource. The additional network resource information may include a second identity of the second network resource and the third authentication information.

Through the automatic access configuration, the embodiments of the present disclosure may effectively resolve the connection problem in the hybrid cloud but not increase the workload in network transport.

Figure 10:
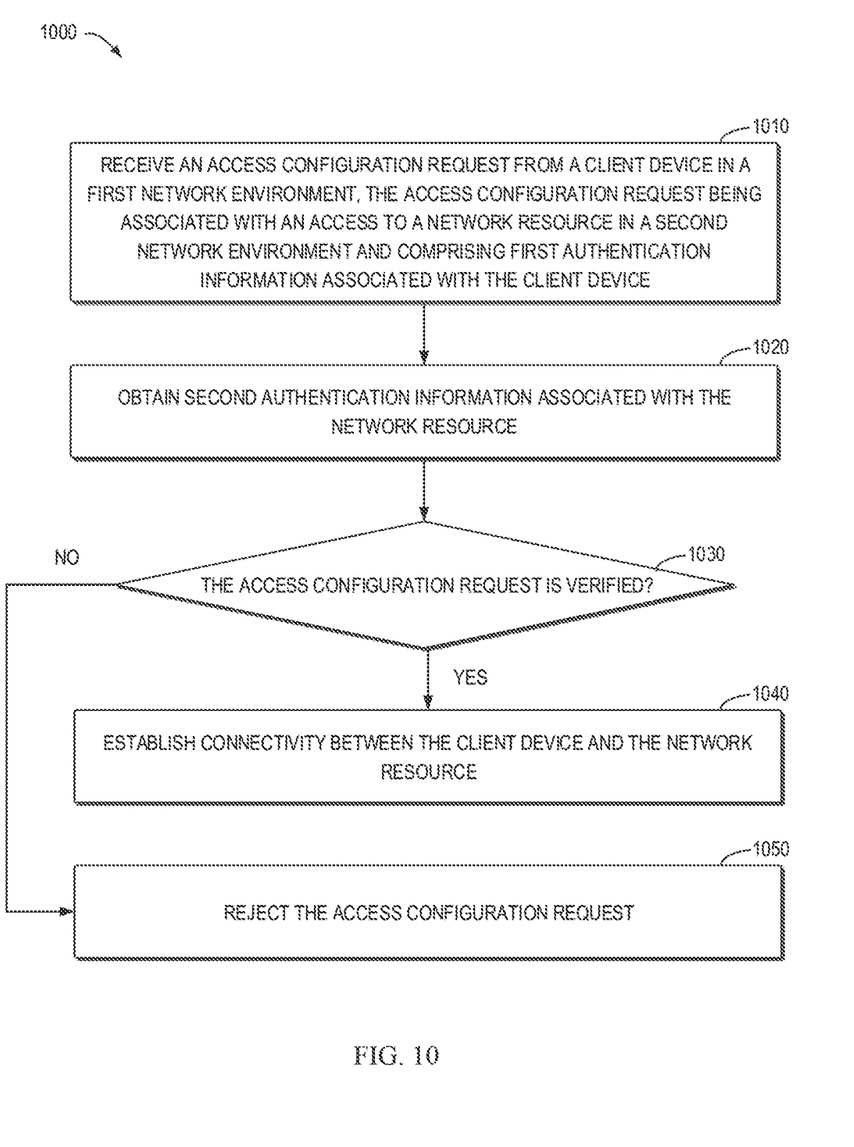
FIG. 10 depicts a flowchart of an example method in accordance with some embodiments of the present disclosure.

FIG. 10 illustrates a flowchart of an example method 1000 in accordance with some embodiments of the present disclosure. The method 1000 may be implemented by the configuration server 640 as shown in FIG. 6. The method 1000 may also be implemented by any other devices or device clusters similar to the configuration server 640. For purpose of description, the method 1000 is described with reference to FIG. 6.

As shown in FIG. 10, at block 1010, the configuration server 640 may receive an access configuration request from a client device in a first network environment. The access configuration request may be associated with an access to a network resource in a second network environment and may comprise first authentication information associated with the client device.

At block 1020, the configuration server 640 may obtains second authentication information associated with the network resource.

At block 1030, the configuration server 640 may determine whether the access configuration request is verified based on the first and second authentication information.

At block 1040, in accordance with a determination that the access configuration request is verified, the configuration server 640 may establish connectivity between the client device and the network resource.

In some embodiments, at block 1050, in accordance with a determination that the access configuration request is not verified, the configuration server 640 may reject the access configuration request.

In some embodiments, the access configuration request may comprise a HTTP or HTTPS request, and a header of the HTTP or HTTPS request may indicate at least one selected from the group consisting of a first identity of the network resource and an access mode of the access.

In some embodiments, the step of obtaining second authentication information associated with the network resource may comprise: determining the first identity of the network resource from the access configuration request; and determining the second authentication information from a set of network resource information corresponding to a set of network resources based on the first identity of the network resource, here the set of network resource information may comprise a set of identities of the set of network resources and a set of corresponding authentication information.

In some embodiments, the access configuration request may further indicate an access mode of the access, and the set of network resource information may further comprise a set of access mode information corresponding to the set of corresponding authentication information. The step of determining the second authentication information from the set of network resource information may comprise: determining the second authentication information from the set of network resource information based on the first identity of the network resource and the access mode of the access.

In some embodiments, the set of network resource information may further comprise a set of security levels associated with the set of network resources. Then the step of determining the second authentication information from the set of network resource information may comprise: determining a security level associated with the network resource from the set of network resource information; comparing the security level associated with the network resource with a threshold level, in response to the security level being less than the threshold level, determining the second authentication information from the set of network resource information; and in response to the security level being greater than or equal to the threshold level, rejecting the access configuration request.

In some embodiments, the network resource may comprise a first network resource, and the method 1000 may further comprise: obtaining a notification indicating an initiation of a second network resource in a third network environment. The third network environment may be different from or same as the second network environment, and the notification may comprise third authentication information associated with the second network resource; and updating the set of network resource information by adding additional network resource information corresponding to the second network resource, the additional network resource information at least comprising a second identity of the second network resource and the third authentication information.

In some embodiments, the first authentication information may be generated using a public token associated with the network resource, and the second authentication information may comprise a secret key associated with the network resource.

In some embodiments, the step of determining whether the access configuration request is verified based on the first and second authentication information may comprise: determining whether the client token matches with the secret key; and in response to the client token matching with the secret key, determining the access configuration request is verified.

In some embodiments, the step of establishing connectivity between the client device and the network resource may comprise: adding the client device to a permission list associated with the second network environment.

In some embodiments, the step of determining whether the access configuration request is verified based on the first and second authentication information may comprise: initiating a container based on the access configuration request and the second authentication information; and utilizing the container to determine whether the access configuration request is verified.

In some embodiments, the method may further comprise: in response to the establishment of the connectivity between the client device and the network resource, releasing the initiated container.

In some embodiments, the method may further comprise: providing a response to the client device indicating that the connectivity between the client device and the network resource is established.

In some embodiments, the first network environment may comprise a public cloud, and the second network environment may comprise a private cloud.

In some embodiments, the network resource may comprise at least one selected from the group consisting of one or more servers in the second network environment, one or more services deployed in the second network environment, and one or more storage devices in the second network environment.

It should be noted that the method 1000 of access configuration in hybrid network environments according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a configuration server, an access configuration request from a client device in a first network environment, the access configuration request including a request for access to an identified network resource in a second network environment, the access configuration request including first authentication information associated with the client device, the access configuration request being a hypertext transfer protocol (HTTP) request having an encrypted token in a message body of the request, the first network environment being a different computing environment than the second network environment;
   responsive to receiving the access configuration request, obtaining, by the configuration server, second authentication information associated with the identified network resource;
   initiating, by the configuration server, a validation container for determining whether the access configuration request is verified based on the first and second authentication information;
   responsive to determining the access configuration request is verified, communicating with a controller of the second network environment to determine availability of the network resource;
   responsive to the network resource becoming available and, based on a security level of the network resource being below a security threshold, receiving, from the controller, a secret key associated with the network resource;
   automatically establishing connectivity between the client device and the identified network resource using the secret key; and causing, by the configuration server, an addition of the client device to a permission list based on the access configuration request being verified.

2. The method of claim 1, wherein:
a header of the HTTP request indicates an access mode of the requested access to the identified network resource.

3. The method of claim 1, wherein obtaining the second authentication information comprises:
determining the second authentication information from a set of network resource information corresponding to a set of network resources, the second authentication information being determined by cross-referencing the identified network resource in the set of network resources with corresponding authentication information.

4. The method of claim 1, wherein:
the access configuration request further includes an access mode of the requested access to the identified network resource, and
obtaining the second authentication information includes:
determining the second authentication information from a set of network resource information by cross-referencing the identified network resource and the access mode with corresponding authentication information.

5. The method of claim 1, wherein obtaining the second authentication information comprises:
determining the second authentication information from a set of network resource information corresponding to a set of network resources, the set of network resource information including a set of security levels associated with the set of network resources by:
determining the security level associated with the identified network resource in the set of network resource information; and
comparing the security level with the security threshold.

6. The method of claim 1, wherein:
the identified network resource comprises a first network resource having a first identity, and
the second authentication information is associated with the identified network resource by a set of network resource information in which a set of network resources are associated by identity with corresponding authentication information; and
the method further comprising:
obtaining a notification indicating an initiation of a second network resource in a third network environment, wherein the third network environment is different from the second network environment, and the notification comprises third authentication information associated with the second network resource; and
updating the set of network resource information by adding additional network resource information corresponding to the second network resource, the additional network resource information comprising a second identity of the second network resource and the third authentication information.

7. The method of claim 1, wherein the first authentication information comprises a client token associated with the client device.

8. The method of claim 7, further comprising:
determining whether the client token matches with the secret key.

9. The method of claim 1, wherein the first network environment comprises a public cloud, and the second network environment comprises a private cloud.

10. A system comprising:
a processing unit; and
a memory coupled to the processing unit and storing instructions thereon, the instructions, when executed by the processing unit, performing acts including:
receiving, by a configuration server, an access configuration request from a client device in a first network environment, the access configuration request including a request for access to an identified network resource in a second network environment, the access configuration request including first authentication information associated with the client device, the access configuration request being a hypertext transfer protocol (HTTP) request having an encrypted token in a message body of the request, the first network environment being a different computing environment than the second network environment;
responsive to receiving the access configuration request, obtaining, the configuration server, second authentication information associated with the identified network resource;
initiating, by the configuration server, a validation container for determining whether the access configuration request is verified based on the first and second authentication information;
responsive to determining the access configuration request is verified, communicating with a controller of the second network environment to determine availability of the network resource;
responsive to the network resource becoming available and, based on a security level of the network resource being below a security threshold, receiving, from the controller, a secret key associated with the network resource;
automatically establishing connectivity between the client device and the identified network resource using the secret key; and
causing, by the configuration server, an addition of the client device to a permission list based on the access configuration request being verified.

11. The system of claim 10, wherein:
a header of the HTTP request indicates an access mode of the requested access to the identified network resource.

12. The system of claim 10, wherein obtaining the second authentication information comprises:
determining the second authentication information from a set of network resource information corresponding to a set of network resources, the second authentication information being determined by cross-referencing the identified network resource in the set of network resources with corresponding authentication information.

13. The system of claim 10, wherein:
the access configuration request further includes an access mode of the requested access to the identified network resource, and
obtaining the second authentication information includes:
determining the second authentication information from a set of network resource information by cross-referencing the identified network resource and the access mode with corresponding authentication information.

14. The system of claim 10, wherein obtaining the second authentication information comprises:
determining the second authentication information from a set of network resource information corresponding to a set of network resources, the set of network resource information including a set of security levels associated with the set of network resources by:
  determining the security level associated with the identified network resource in the set of network resource information; and
  comparing the security level with the security threshold.

15. The system of claim 10, wherein:
the identified network resource comprises a first network resource having a first identity, and
the second authentication information is associated with the identified network resource by a set of network resource information in which a set of network resources are associated by identity with corresponding authentication information; and
the instructions, when executed by the processing unit, further performing acts including:
obtaining a notification indicating an initiation of a second network resource in a third network environment, wherein the third network environment is different from the second network environment, and the notification comprises third authentication information associated with the second network resource; and
updating the set of network resource information by adding additional network resource information corresponding to the second network resource, the additional network resource information comprising a second identity of the second network resource and the third authentication information.

16. The system of claim 10, wherein the first authentication information comprises a client token associated with the client device.

17. The system of claim 16, the instructions, when executed by the processing unit, further performing acts including:
  determining whether the client token matches with the secret key.

18. A computer program product being stored on a computer readable storage medium and comprising machine-executable instructions, the instructions, when executed on a device, causing the device to perform acts comprising:
  receiving, by a configuration server, an access configuration request from a client device in a first network environment, the access configuration request including a request for access to an identified network resource in a second network environment, the access configuration request including first authentication information associated with the client device, the access configuration request being a hypertext transfer protocol (HTTP) request having an encrypted token in a message body of the request, the first network environment being a different computing environment than the second network environment;
  responsive to receiving the access configuration request, obtaining, the configuration server, second authentication information associated with the identified network resource;
  initiating, by the configuration server, a validation container for determining whether the access configuration request is verified based on the first and second authentication information;
  responsive to determining the access configuration request is verified, communicating with a controller of the second network environment to determine availability of the network resource;
  responsive to the network resource becoming available and, based on a security level of the network resource being below a security threshold, receiving, from the controller, a secret key associated with the network resource;
  automatically establishing connectivity between the client device and the identified network resource using the secret key; and
  causing, by the configuration server, an addition of the client device to a permission list based on the access configuration request being verified.

* * * * *